United States Patent
Balakrishnan et al.

(10) Patent No.: US 12,418,394 B2
(45) Date of Patent: Sep. 16, 2025

(54) RECEIVER WITH FLEXIBLE LINK SYNCHRONIZATION

(71) Applicant: TEXAS INSTRUMENTS INCORPORATED, Dallas, TX (US)

(72) Inventors: Jaiganesh Balakrishnan, Bengaluru (IN); Kandalla Krishna, Bengaluru (IN); Aravind Vijayakumar, Bengaluru (IN); Goutham Ramesh, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/174,395

(22) Filed: Feb. 24, 2023

(65) Prior Publication Data

US 2024/0291632 A1 Aug. 29, 2024

(51) Int. Cl.
*H04L 7/04* (2006.01)
*H04L 1/00* (2006.01)
*H04L 7/00* (2006.01)

(52) U.S. Cl.
CPC ............. *H04L 7/04* (2013.01); *H04L 1/0057* (2013.01); *H04L 7/0079* (2013.01)

(58) Field of Classification Search
CPC ......... H04L 7/042; H04L 7/04; H04L 7/0079; H04L 1/0057; H04L 1/0061
See application file for complete search history.

(56) References Cited

U.S. PATENT DOCUMENTS

| | | | |
|---|---|---|---|
| 2002/0059445 A1* | 5/2002 | Wong | G06F 7/02 709/236 |
| 2013/0031348 A1* | 1/2013 | Gillespie | G06F 9/4401 713/2 |
| 2014/0237329 A1* | 8/2014 | Cao | H04L 1/00 714/819 |

* cited by examiner

*Primary Examiner* — Khanh C Tran
(74) *Attorney, Agent, or Firm* — Mandy Barsilai Fernandez; Frank D. Cimino

(57) ABSTRACT

A receiver includes: a PHY layer, and a processor coupled to the PHY layer. The processor is configured to: receive a set of data bits from the PHY layer; compare the set of data bits to a sync header pattern; determine a mismatch metric responsive to the comparison and to an adjustable scaling factor, and execute link synchronization operations based on the mismatch metric.

20 Claims, 11 Drawing Sheets

RECEIVER WITH FLEXIBLE LINK SYNCHRONIZATION

BACKGROUND

Many electronic systems and devices include integrated circuits (ICs) and related communication interfaces. ICs may communicate, for example, via serial communication interfaces and parallel communication interfaces. There are many communication interface protocols, and these communication interface protocols vary with regard to security, data rate, bit error rate, and/or other parameters. JESD is a serial interface standard to transfer data between data converter ICs and logic device ICs. Example data converter IC include analog-to-digital converters (ADCs), digital-to-analog converters (DACs), and/or integrated transceivers with ADCs and DACs. Example logic device ICs include baseband processor ICs, field-programmable gate arrays (FPGAs), and application-specific integrated circuits (ASICs).

JESD currently has two protocol variants: JESD 204B and JESD 204C. JESD 204C supports interface rates up to 32.5 Gbps using non-return-to-zero (NRZ) encoding/decoding in the PHY layer. The bit error rate for NRZ is approximately $10^{-15}$. A higher speed variant, JESD 204D, is under development. JESD 204D will support interface rates up to 112 gigabits per second (Gbps) using pulse amplitude modulation 4-level (PAM4) encoding/decoding in the PHY layer. The bit error rate for PAM4 is approximately $10^{-4}$ to $10^{-5}$. To account for the higher BER of PAM4 relative to the BER of NRZ, JESD 204D will employ forward error correction (FEC).

JESD 204D will support higher interface rates and lower interface power consumption and area as fewer lanes are used to transfer data for the given signal bandwidth. For example, an integrated transceiver may use only 16 JESD 204D lanes instead of 32 JESD 204C lanes, to support 16 complex baseband I/Q streams with a 1200 MHz bandwidth.

SUMMARY

In an example, a receiver comprises: a PHY layer; and a processor coupled to the PHY layer. The processor is configured to: receive a set of data bits from the PHY layer; perform a comparison of the set of data bits to a sync header pattern; determine a mismatch metric responsive to the comparison and to an adjustable scaling factor; and execute link synchronization operations based on the mismatch metric.

In another example, a receiver method comprises: receiving a set of data bits; compare the set of data bits to a sync header pattern; determining a mismatch metric responsive to the comparison and to an adjustable scaling factor; and executing link synchronization operations based on the mismatch metric.

In yet another example, a system comprises: a first integrated circuit (IC) having a transmitter; a serial communication interface; and a second IC having a receiver in communication with the transmitter via the serial communication interface. The receiver is configured to: receive a set of data bits; compare the set of data bits to a sync header pattern; determine a mismatch metric responsive to the comparison and to an adjustable scaling factor; and execute link synchronization operations based on the mismatch metric.

DETAILED DESCRIPTION

Figure 1A:
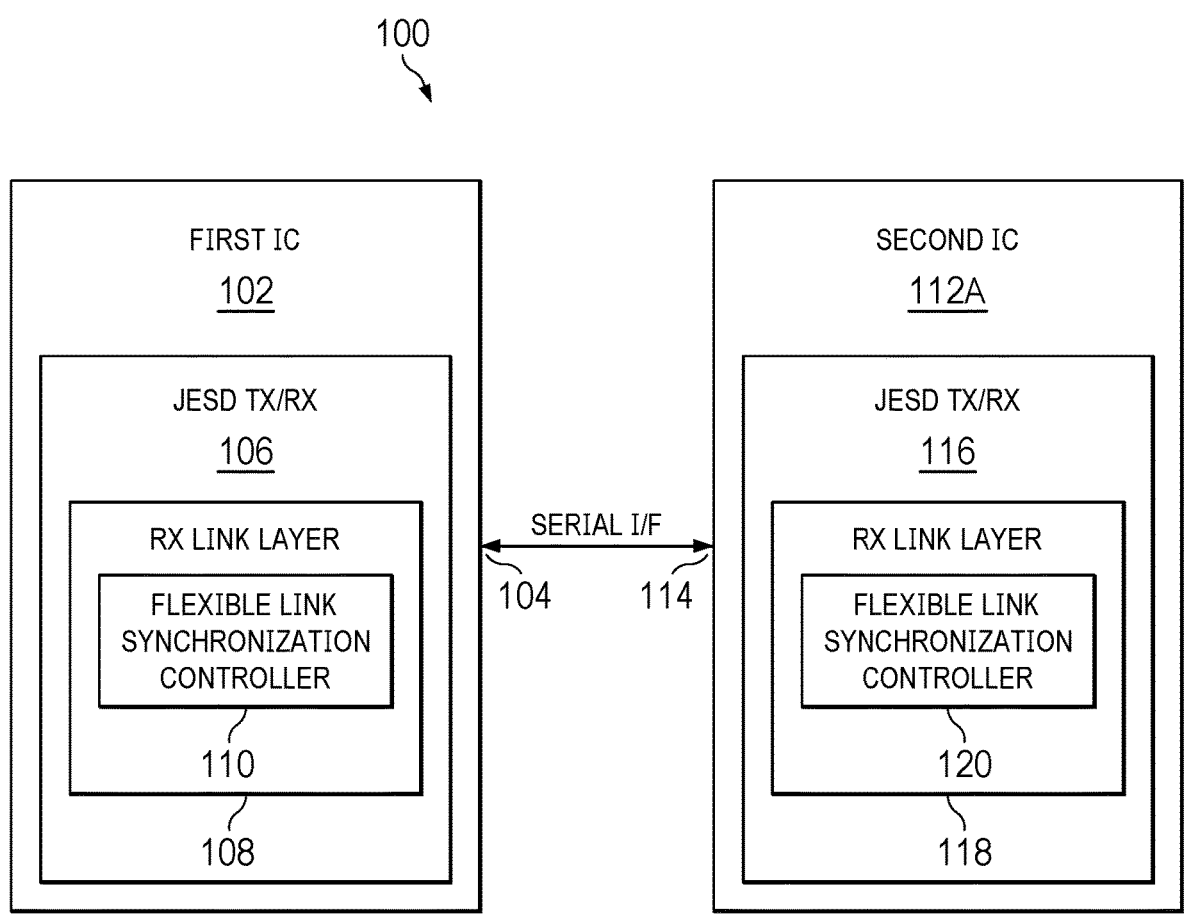
FIG. 1A is a block diagram showing an example system.

The same reference numbers or other reference designators are used in the drawings to designate the same or similar features. Such features may be the same or similar either by function and/or structure.

FIG. 1A is a block diagram showing an example system 100. The system 100 may be, for example, a cellular base station system or a radar system. As shown, the system includes a first integrated circuit (IC) 102 and a second IC 112. In some examples, the first IC 102 includes an integrated transceiver and/or other circuitry having one or more data converters. One example data converter is an analog-to-digital converter (ADC). Another example data converter is a digital-to-analog converter (DAC). In some examples, the second IC 112 includes a baseband processor. One example baseband processor is a field-programmable gate array (FPGA). Another example baseband processor is an application-specific integrated circuits (ASIC). In the example of FIG. 1A, the first IC 102 includes a serial interface 104 and a JESD transceiver (TX/RX) 106. The JESD transceiver 106 includes an RX link layer 108. The RX link layer 108 includes a flexible link synchronization controller 110. The second IC 112 includes a serial interface 114 and a JESD transceiver 116. The JESD transceiver 116 includes an RX link layer 118. The RX link layer 118 includes a flexible link synchronization controller 120.

In some examples, the first IC 102 includes only a JESD transmitter or only a JESD receiver rather than a transceiver. Similarly, the second IC 112 may include only a JESD transmitter or only a JESD receiver in some examples. As another option, the first IC 102 may include the JESD transceiver 106, while the second IC 112 includes only a JESD transmitter or only a JESD receiver. As another option, the second IC 112 may include the JESD transceiver 116, while the first IC 102 includes only a JESD transmitter or only a JESD receiver.

Regardless of the particular arrangement, the system 100 includes at least one receiver link layer having a flexible link synchronization controller such as the flexible link synchronization controller 110 of the first IC 102 or the flexible link synchronization controller 120 of the second IC 112. In some examples, each of the flexible link synchronization controllers 110 and 120 performs flexible link synchronization operations based on a mismatch metric and an adjustable scaling factor. The flexible link synchronization operations improve link synchronization when bit error rates (BERs) are above a threshold. While designed for use with the BER of pulse amplitude modulation 4-level (PAM4) encoding/decoding used for JESD 204D, the flexible link synchronization controllers 110 and 120 and related operations may be used with other communication protocols.

Figure 1B:
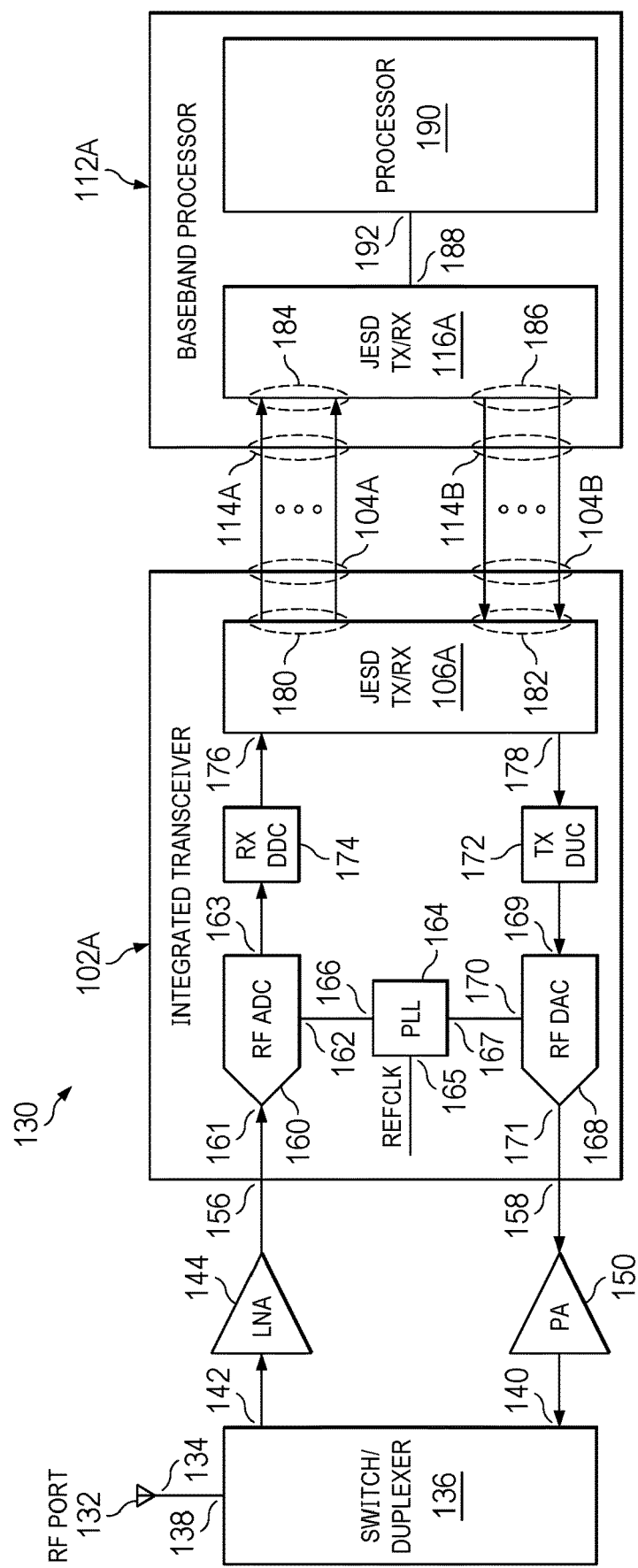
FIG. 1B is a block diagram showing another example system.

FIG. 1B is a block diagram showing another example system 130. As shown, the system 130 includes an integrated transceiver IC 102A and a baseband processor IC 112A. The integrated transceiver IC 102A is an example of the first IC 102 in FIG. 1A. The baseband processor IC 112A is an example of the second IC 112 in FIG. 1A.

In the example of FIG. 1B, the baseband processor IC 112A has a set of serial input channels 114A and a set of serial output channels 114B. The set of serial input channels 114A and the set of serial output channels 114B are an example of the serial interface 114 in FIG. 1A. As shown, the baseband processor IC 112A includes a processor 190 and a JESD transceiver 116A. The JESD transceiver 116A is an example of the JESD transceiver 116 in FIG. 1A. In the example of FIG. 1B, JESD transceiver 116A has a set of serial input channels 184, a set of serial output channels 186, and a communication interface 188. The processor 190 also has a communication interface 192.

The integrated transceiver IC 102A has an input 156, an output 158, a set of serial output channels 104A, and a set of serial input channels 104B. The set of serial output channels 104A and the set of serial input channels 104B are an example of the serial interface 104 in FIG. 1A. In some examples, the integrated transceiver IC 102A includes a radio frequency (RF) ADC 160, a phase-locked loop (PLL) 164, a RF DAC 168, a TX digital up-converter (TX DUC) 172, an RX digital down-converter (RX DDC) 174, and a JESD transceiver 106A. The JESD transceiver 106A is an example of the JESD transceiver 106 in FIG. 1A. The RF ADC 160 has a first input 161, a second input 162, and an output 163. The PLL 164 has a clock input 165, a first clock output 166, and a second clock output 167. The RF DAC 168 has a first input 169, a second input 170, and an output 171. The TX DUC 172 has an input and an output. The RX DDC 174 has an input and an output. The JESD transceiver 106A. The JESD transceiver 106A has an input 176, a serial output interface 180, and a serial input interface 182.

As shown, the system 130 also includes an RF port 132, a switch or duplexer 136, a low-noise amplifier (LNA) 144, and a power amplifier (PA) 150. The RF port 132 has a terminal 134 and may include an RF antenna. The switch or duplexer 136 has a terminal 138, an input 140, and an output 142. The LNA 144 has an input and an output. The PA 150 has an input and an output. In some examples, the system 130 includes multiple analog channels, each analog channel having a respective RF port, a respective switch or duplexer, a respective LNA, and a respective PA. In such examples, the integrated transceiver IC 102A includes additional components such as an RF ADC, an RF DAC, an RX DDC, and a TX DUC for each analog channel. Also, the JESD transceiver 106A may include inputs (not shown) in addition to the input 176 and outputs (not shown) in addition to the output 178 to support communications to and from each of multiple analog channels.

In the example of FIG. 1B, the terminal 134 of the RF port 132 is coupled to the terminal 138 of the switch or duplexer 136. The input 140 of the switch or duplexer 136 is coupled to the output of the PA 150. The input of the PA 150 is coupled to the output 158 of the integrated transceiver IC 102A. The output 142 of the switch or duplexer 136 is coupled to the input of the LNA 144. The output of the LNA 144 is coupled to the input 156 of the integrated transceiver IC 102A.

The input 156 of the integrated transceiver IC 102A is coupled to the first input 161 of the RF ADC 160. The second input 162 of the RF ADC 160 is coupled to the first clock output 166 of the PLL 164. The output 163 of the RF ADC 160 is coupled to the input of RX DDC 174. The output of the RX DDC 174 is coupled to the input 176 of the JESD transceiver 106A. The serial output interface 180 of the JESD transceiver 106A is coupled to the serial output channels 104A of the integrated transceiver 102A. The serial input interface 182 of the JESD transceiver 106A is coupled to the serial input channels 104B of the integrated transceiver 102A. The output 178 of the JESD transceiver 106A is coupled to the input of the TX DUC 172. The output of the TX DUC 172 is coupled to the first input 169 of the RF DAC 168. The second input 170 of the RF DAC 168 is coupled to the second clock output 167 of the PLL 164. The output 171 of the RF DAC 168 is coupled to the output 158 of the integrated transceiver 102A.

With the system 130, data may be transferred from the baseband processor IC 112A to the RF port 132 via the integrated transceiver 102A, the PA 150, and the switch or duplexer 136. During such data transfers, the processor 190 of the baseband processor IC 112A may provide data to be transferred. The JESD transceiver 116A of the baseband processor IC 112A: receives the data provided by the processor 190 via the communications interfaces 192 and 188; prepares the data for transmission according to a JESD communication protocol; and transmits the prepared data to the JESD transceiver 106A of the integrated transceiver 102A via the set of serial output channels 186 of the JESD transceiver 116A, the set of serial output channels 114B of the baseband processor IC 112A, the set of serial input channels 104B of the integrated transceiver 102A, and the serial input interface 182 of the JESD transceiver 106A. In some examples, the JESD transceivers 106A and 116A perform flexible link synchronization operations as described herein to complete data transfers from the JESD transceiver 116A to the JESD transceiver 106A.

The data received from the JESD transceiver 116A by the JESD transceiver 106A is decoded and prepared for transmission as an analog signal by the integrated transceiver 102A. In some examples, the JESD transceiver 106A outputs a digital signal at the output 178 responsive to the decoded data. The TX DUC 172 increases the center frequency of the digital signal. Prior to up-converting the digital signal by increasing its center frequency, the TX DUC 172 may optionally interpolate-and-filter the input digital signal.

The RF DAC 168 converts the upconverted digital signal to an analog signal responsive to the clock signal provided at the second clock output 167 of the PLL 164 and received at the second input 170 of the RF DAC 168. The analog signal is provided at the output 171 of the RF DAC 168 and is conveyed to the input of the PA via the output 158 of the integrated transceiver 102A. The PA 150 amplifies the analog signal and provides the amplified analog signal at its output. The switch or duplexer 136: receives the amplified analog signal at its input 140; and provides the amplified analog signal at the terminal 138, which is coupled to the terminal 134 of the RF port 132. In some examples, the switch or duplexer 136 conveys analog signals in one direction at a time (to or from the RF port 132). In other examples, the switch or duplexer 136 conveys analog signals in both directions at the same time (to and from the RF port 132).

In the example of FIG. 1B, data may be transferred from the RF port 132 to the baseband processor IC 112A via the switch or duplexer 136, the LNA 144, and the integrated transceiver 102A. During such data transfers, the RF port 132 conveys an analog signal to the switch or duplexer 136. The RF port 132 receives the analog signal at its terminal 138 and provides the analog signal at the output 142. The LNA 144 receives the analog signal at its input and provides an amplified analog signal at its output. The amplified analog signal is provided from the output of the LNA 144 to the input 156 of the integrated transceiver 102A.

The amplified analog signal is provided from the input 156 to the first input 161 of the RF ADC 160. The RF ADC 160 digitizes the received analog signal, resulting in a digital signal at the output 163. The digital signal provided by the RF ADC 160 has a frequency based on the clock signal provided at the first clock output 166 of the PLL 164 and received at the second input 162 of the RF ADC 160. The digital signal provided by the RF ADC 160 is received by the RX DDC 174, which operates to reduce the center frequency of the digital signal. After down-converting the digital signal by reducing its center frequency, the RX DDC 174 may optionally filter-and-decimate the down-converted digital signal.

The JESD transceiver 106A: receives the down-converted digital signal from the RX DDC 174; prepares the data for transmission according to a JESD communication protocol; and transmits the prepared data to the JESD transceiver 116A of the baseband transceiver IC 112A via the serial output interface 180 of the JESD transceiver 106A, the set of serial output channels 114B of the integrated transceiver 102A, the set of serial input channels 114A of the baseband processor IC 112A, and the set of serial input channels 184 of the JESD transceiver 116A. In some examples, the JESD transceivers 106A and 116A perform flexible link synchronization operations as described herein to complete data transfers from the JESD transceiver 106A to the JESD transceiver 116A.

The data received from the JESD transceiver 106A by the JESD transceiver 116A is decoded and prepared for transmission as a digital signal to the processor 190 via the communication interfaces 188 and 192. The decoded data received by the processor 190 may be stored, processed, and/or transferred in different examples. With flexible link synchronization operations as described herein, the system 130 improves link synchronization results when bit error rates (BERs) are above a threshold. Such BERs are expected, for example, with JESD 204D.

Figure 2:
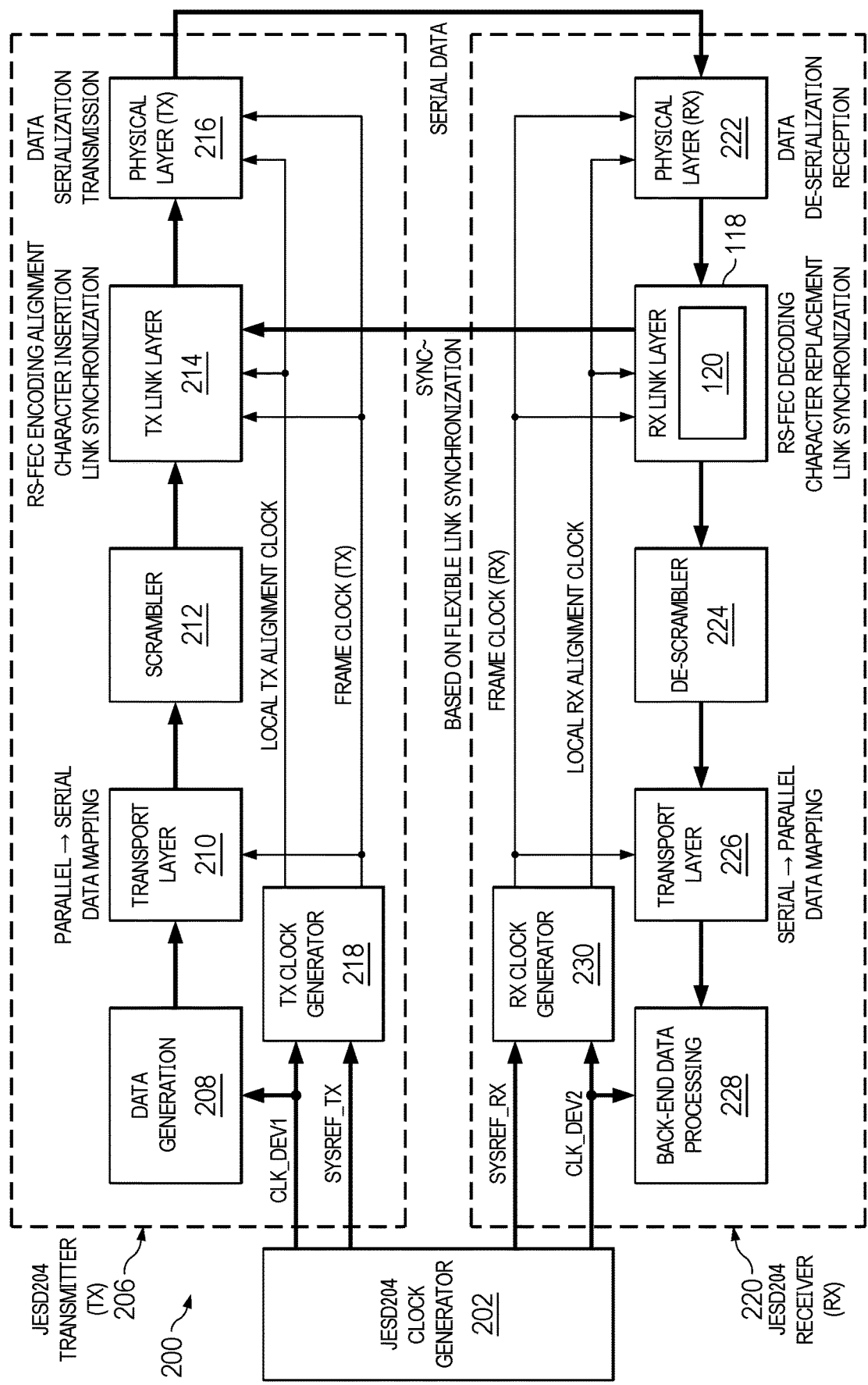
FIG. 2 is a block diagram showing an example JESD204 system.

FIG. 2 is a block diagram showing an example JESD204 system 200. In some examples, the JESD204 system 200 is a JESD 204D system. As shown, the JESD204 system 200 includes a JESD204 clock generator 202, a JESD204 transmitter 206, and a JESD204 receiver 220. The JESD204 transmitter 206 includes a data generation block 208, a transport layer 210, a scrambler 212, a TX link layer 214, a physical (PHY) layer 216, and a TX clock generator 218. The JESD204 receiver 220 includes a PHY layer 222, the RX link layer 118, a de-scrambler 224, a transport layer 226, a back-end data processing block 228, and an RX clock generator 230. Given the high-speed nature of operations of the JESD204 transmitter 206 and the JESD204 receiver 220, the related blocks are generally implemented in hardware. In different examples, the data generation block 208 and the back-end data processing block 228 may be partitioned between hardware and software, or may be completely implemented in hardware.

In some examples, the JESD204 transmitter 206 is part of the JESD transceiver 106 of FIG. 1A or the JESD transceiver 106A of FIG. 1B, while the JESD204 receiver 220 is part of the JESD transceiver 116 of FIG. 1A or the JESD transceiver 116A of FIG. 1B. As another option, the JESD204 transmitter 206 may be part of the JESD transceiver 116 of FIG. 1A or the JESD transceiver 116A of FIG. 1B, while the JESD204 receiver 220 is part of the JESD transceiver 106 of FIG. 1A or the JESD transceiver 106A of FIG. 1B.

In the example of FIG. 2, the JESD204 clock generator 202 provides a first device clock (CLK_DEV1) and a transmitter system clock (SYSREF_TX) to the TX clock generator 218 of the JESD204 transmitter 206. The JESD204 clock generator 202 also provides a second device clock (CLK_DEV2) and a receiver system clock (SYSREF_RX) to the RX clock generator 230 of the JESD204 receiver 220. In some examples, CLK_DEV1=CLK_DEV2 and SYSREF_TX=SYSREF_RX. In different examples, the TX clock rate and the RX clock rate may be the same or different.

In operation, the data generator block 208 generates transmit data to be transmitted. The transport layer 210 groups converter samples and control bits into frames which are then passed to the TX link layer 214 via the scrambler 212. The framed transmit data may be provided to scrambler 212, which performs a data scrambling operation. In some examples, the scrambler 212 is a multiplicative scrambler that multiples the input signal by a scrambling transfer function. The scrambling operations result in: 1) sufficient transition density; and 2) avoidance of spectral peaks that may be produced when the same data octet repeats from frame to frame.

In such case, the scrambled and mapped transmit data is provided from the scrambler 212 to the TX link layer 214. The TX link layer 214 operates to: 1) add a synchronization header; 2) perform Reed-Solomon forward error correction (RS-FEC) by adding parity symbols; and 3) output encoded data. The synchronization header facilitates FEC, frame, and lane alignment. The PHY layer 216 receives the encoded data from the TX link layer 214 and transmits the encoded data to the JESD204 receiver 220 as serial data. The TX clock generator 218 operates to generate a frame clock and a local TX alignment clock for the JESD204 transmitter 206 responsive to CLK_DEV1 and SYSREF_TX. As shown, the operations of the transport layer 210 are based on the frame clock provided by the TX clock generator 218. Also, the operations of the TX link layer 214 and PHY layer 216 are based on the frame clock and the local TX alignment clock provided by the TX clock generator 218.

The PHY layer 222 of the JESD204 receiver 220 receives the encoded serial data. The RX link layer 118 operates to: 1) align the incoming data using a sync header alignment process; and 2) perform FEC decoding. In some examples, FEC decoding includes correction of errors (if necessary), removal of FEC parity symbols, and removal of the sync header. The de-scrambler 224 operates to de-scramble the received data when the scrambler 212 of the JESD204 transmitter 206 is used. The transport layer 226 ungroups the frames received from the RX link layer 118 into converter samples and control bits. The back-end data processing block 228 performs data processing on the received data. The RX clock generator 230 operates to generate a frame clock and a local RX alignment clock for the JESD204 receiver 220 responsive to CLK_DEV2 and SYSREF_RX.

As shown, the operations of the transport layer 210 are based on the frame clock provided by the RX clock generator 230. Also, the operations of the RX link layer 118 and PHY layer 222 are based on the frame clock and the local RX alignment clock provided by the RX clock generator 230.

In the example of FIG. 2, the RX link layer 118 include the flexible link synchronization controller 120. In some examples, the flexible link synchronization controller 120 is performed as described herein. Without limitation, the flexible link synchronization controller 120 may perform link synchronization based on sync headers inserted into the data stream by TX link layer 214. Relative to other link synchronization techniques, the mismatch metric and adjustable scaling factor used by the flexible link synchronization controller 120 improves link synchronization when the BER of communications between a transmitter (e.g., the JESD204 transmitter 206) and a receiver (e.g., the JESD204 receiver 220) are above a threshold.

Figure 3:
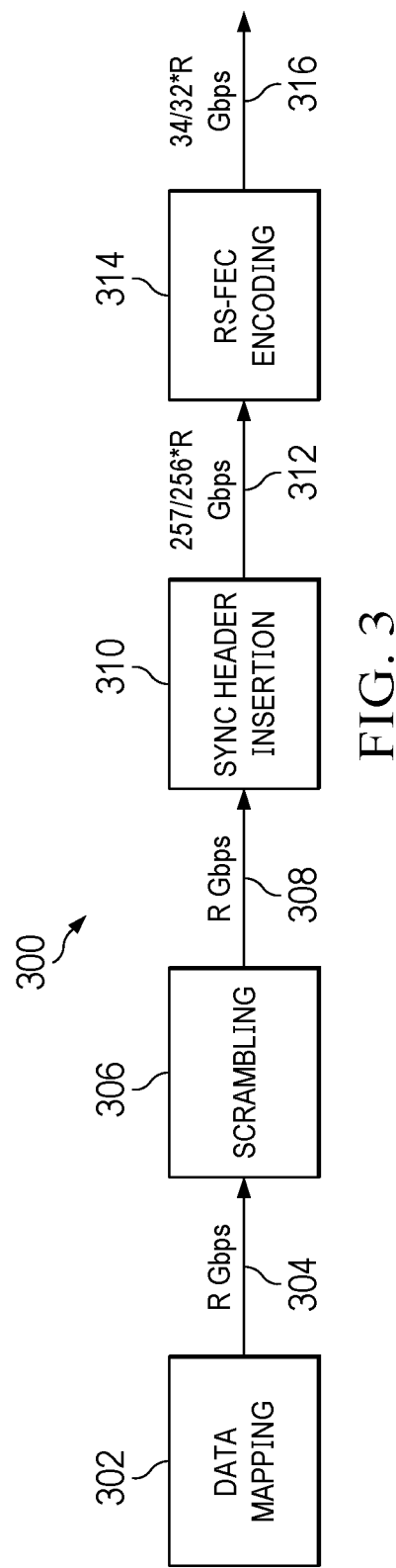
FIG. 3 is a block diagram showing an example data preparation process.

FIG. 3 is a block diagram showing an example data preparation process 300. As shown, the data preparation process 300 includes data mapping at block 302. The output 304 of block 302 has a rate of R gigabits per second (Gbps). The data rate R depends on the baseband interface rate, the effective number of converters that are mapped on to a single JESD lane, and the number of bits used to represent each sample. For example, if the baseband interface rate (B) is 1.5 gigasymbols per second (Gsps), the number of converters (M) mapped to a single JESD lane is 2, and the number of bits (N) used to represent a sample is 16, then R=B*M/N bits=48 Gbps. Without limitation, R may range from about 30 Gbps to about 100 Gbps. At block 306, scrambling is performed on the output 304 of block 302. The output 308 of block 306 has a rate of R Gbps. At block 310, sync header insertion is performed on the output 308 of block 306. In some examples, the output 312 of block 310 has a rate of 257/256*R Gbps. At block 314, RS-FEC encoding is performed on the output 312 of block 310. In some examples, the output 316 of block 314 has a rate of 34/32*R Gbps.

In some examples, the data preparation process 300 is performed by a JESD204 transmitter such as the JESD204 transmitter 206 of FIG. 2. In some examples, block 302 is performed by a transport layer such as the transport layer 210 of FIG. 2. In some examples, block 306 is performed by a scrambler such as the scrambler 212 of FIG. 2. In some examples, blocks 310 and 314 are performed by a TX link layer such as the TX link layer 214 of FIG. 2.

FIGS. 4A-4D are block diagrams showing example data structures 404, 412, 414, and 416 related to the data preparation process 300 of FIG. 3. In some examples, a transmitter (e.g., the JESD204 transmitter 206) and a receiver (e.g., the JESD204 receiver 220) uses an RS-FEC scheme with different code word sizes and error correction capability, to provide tradeoff between decoding latency and coding gain. In some examples, different RS-FEC modes and related parameters ($N_s$, $K_s$, $t_s$) are possible. $N_s$ is the number of code word symbols, $K_s$ is the number of raw data symbols that are encoded, and $t_s$ is the maximum number of symbol errors that can be corrected in a code word. $N_s$-$K_s$ is the number of parity symbols. In a first RS-FEC mode: $N_s$=544; $K_s$=514; and $t_s$=15. In a second RS-FEC mode: $N_s$=272; $K_s$=258; and $t_s$=7. In a third RS-FEC mode: $N_s$=144; $K_s$=130; and $t_s$=7. In a fourth RS-FEC mode: $N_s$=136; $K_s$=130; and $t_s$=3. Without limitation, for FIGS. 4A, 4C, and 4D, $N_s$=544 and $K_s$=514 is assumed.

Figure 4A:
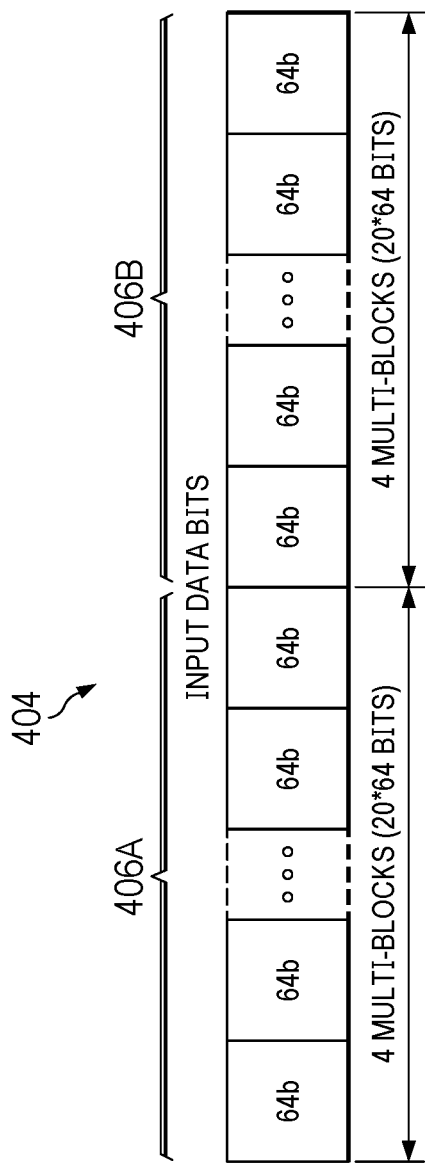
FIGS. 4A-4D are block diagrams showing example data formats related to the data preparation process of FIG. 3.

In FIG. 4A, the data structure 404 includes two data groupings 406A and 406B (referred to as "code words" in the relevant art). Each of the code words 406A and 406B include 4 multi-blocks. Each of the multi-blocks includes 20 sets of 64-bit blocks. In some examples, the output 304 of the block 302 in FIG. 3 has the data structure 404.

Figure 4B:
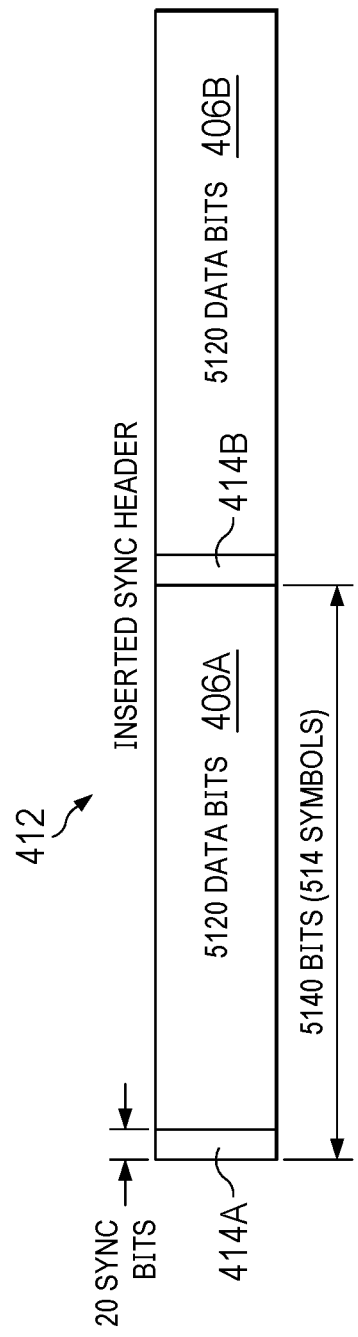

The data structure 412 in FIG. 4B includes an inserted sync header 414A for the code word 406A and an inserted sync header 414B for the code word 406B. In some examples, each of the code words 406A and 406B has 5120 data bits. Each of the sync headers 414A and 414B adds 20 bits for a total of 5140 bits. In some examples, 5140 bits may be represented as 514 symbols (i.e., $K_s$=514). In some examples, the output 312 of the block 310 in FIG. 3 has the data structure 412. Note: while the scrambling operations of block 306 do not change the data rate, the 5120 bits at the output of block 306 correspond to the 4 multi-blocks used in the data structure 412 of FIG. 4B.

Figure 4C:
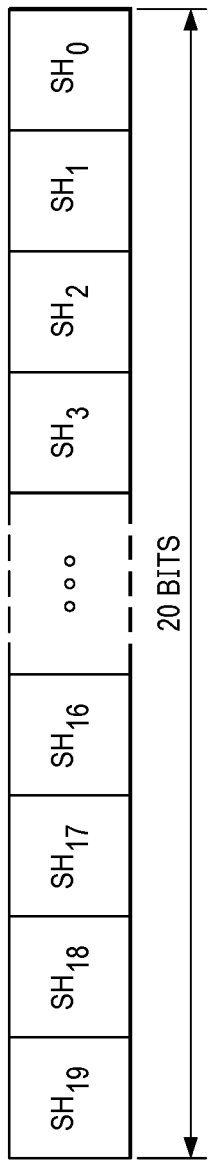

The data structure 414 in FIG. 4C includes 20 sync header bits ($SH_{19}$ to $SH_0$). In some examples, each of the sync headers 414A and 414B of FIG. 4B has the data structure 414. In some examples, the first 18 bits of a sync header has a fixed pattern. The last 2 bits of the sync header are used to indicate the alignment block boundary, which is the bit location where the extended multi-block boundary (EMB) and RS-FEC code word boundary align. In some examples, the last two bits of the sync header may have a "10" or "01" pattern.

The sync header bits or just "sync bits" are used to determine the alignment between the extended EMB and the RS FEC code word boundary. In some examples, each multi-block of data includes 160 bytes (1280 bits) that are concatenated to create an extended multi-block depending on the transport layer parameters. Example transport layer parameters includes the number of bits/sample, the interface rate versus the lane rate, and/or other parameters. As previously noted, the last 2 bits of the sync header are used to indicate the alignment block boundary, while the first 18 bits of the sync header have a fixed and predetermined pattern. With the last two bits of the sync header limited to "10" or "01", the total number of bits for the sync header is equivalent to 19 bits.

Figure 4D:
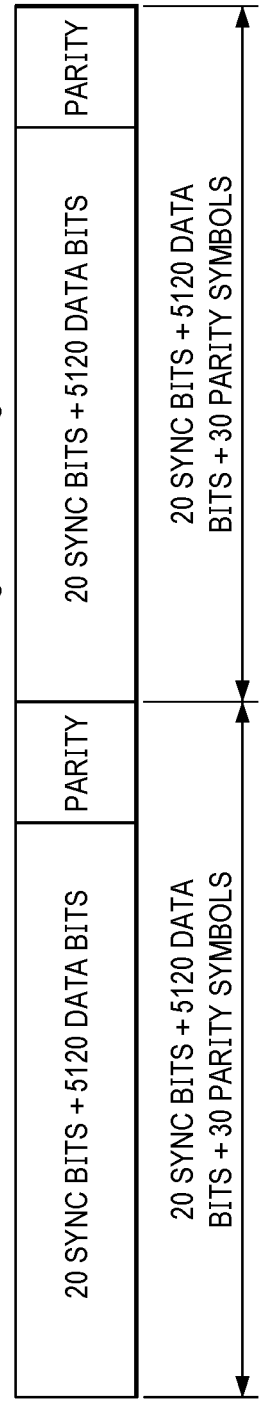

The data structure 416 of FIG. 4D is an RS-FEC encoded bit stream that includes code words and related sync headers separated by parity bits. In some examples, each code word includes 5120 bits and each sync header includes 20 bits. In some examples, the parity bits for each code word and related sync header includes 30 parity symbols. In some examples, the 30 parity symbols include 300 parity bits. In different examples, the number of parity bits, the number of parity bits per symbol, and/or the number of parity symbols may vary. In some examples, the output 316 of the block 314 in FIG. 3 has the data structure 416. In order to properly decode the data structure 416, a receiver, such as the JESD204 receiver 220 of FIG. 2, performs link synchronization operations to identify to the location of each sync header.

To successfully decode the encoded RS-FEC bits, the RS-FEC code word boundary needs to be determined by the receiver. To enable this, a sync header pattern is inserted at the beginning of each code word. The data structure 414 of FIG. 4C is an example sync header pattern. The receiver exploits knowledge of the sync header to synchronize to the RS-FEC code word boundary.

At the receiver, the JESD link is synchronized to the RS-FEC code word boundary by searching over N (e.g., N=5440 for $N_s$=544) possible bit locations. Example parameters of interest in designing a link synchronization scheme include: synchronization time; false lock probability; and probability of miss. For JESD 204D, robustness to received bit errors is an additional parameter due to PAM4 having a higher raw BER, when compared to non-return-to-zero (NRZ) encoding/decoding. As used herein "robustness" to received bit errors refers to the ability of the described link synchronization scheme to not fail, even in presence of received bit errors.

Figure 5:
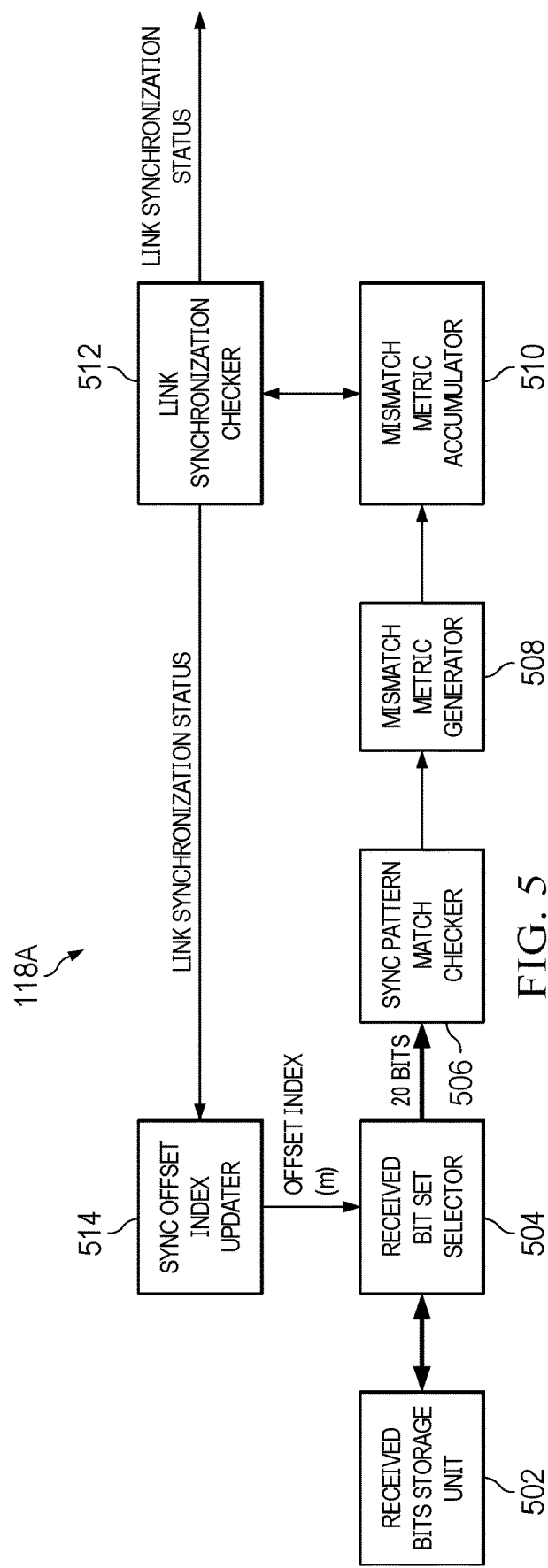
FIG. 5 is a block diagram showing an example link synchronization controller.

FIG. 5 is a block diagram showing an example link synchronization controller 120A. The link synchronization controller 120A is an example of the link synchronization controller 120 in FIGS. 1 and 2. As shown, the link synchronization controller 120A includes a received bit storage unit 502, a received bit set selector 504, a sync pattern match checker 506, a mismatch metric generator 508, a mismatch metric accumulator 510, a link synchronization checker 512, and a sync offset index updater 514. In some examples, the received bit set selector 504, the sync pattern match checker 506, the mismatch metric generator 508, the mismatch metric accumulator 510, the link synchronization checker 512, and the sync offset index updater 514 are implemented as hardware. In other examples, a processor accesses data and executes instructions stored in memory to perform the operations of the received bit set selector 504, the sync pattern match checker 506, the mismatch metric generator 508, the mismatch metric accumulator 510, and the link synchronization checker 512.

The received bit storage unit 502 stores data bits received by the receiver PHY layer such as the PHY layer 222 of FIG. 2. The received bit set selector 504 selects a set of consecutive bits from the received data bits stored by the received bits storage unit 502. In some examples, the received bit set selector 504 selects 20 consecutive bits as a set. The sync pattern match checker 506 compares the selected set of received bits with a predetermined sync header pattern. The mismatch metric generator 508 determines a mismatch metric responsive to results of the comparison performed by the sync pattern match checker. In some examples, the mismatch metric generator 508 determines the mismatch metric responsive to results of the comparison and an adjustable scaling factor.

In some examples, the mismatch metric accumulator 510 determines a cumulative mismatch metric based on iterative operations of the receive bit set selector 504, the sync pattern match checker 506, the mismatch metric generator 508, the link synchronization checker 512, and the sync offset index updater 514. In some examples, the link synchronization checker 512 determines when link synchronization is complete responsive to the cumulative mismatch metric determined by the mismatch metric accumulator 510. In some examples, the link synchronization checker 512 compares the cumulative mismatch metric over multiple iterations to a threshold. If the cumulative mismatch metric is less than the threshold, the link synchronization checker 512 provides a link synchronization status to the sync offset index updater 514, where the link synchronization status indicates link synchronization is successful. In such case, further iterative operations of the sync offset index updater 514, the received bit set selector 504, the sync pattern match checker 506, the mismatch metric generator 508, and the link synchronization checker 512, are terminated or paused. The link synchronization status may also be provided as an output of the link synchronization controller 120A.

If the cumulative mismatch metric is more than the threshold, the link synchronization status indicates link synchronization is not complete. In such case, further iterative operations of the sync offset index updater 514, the received bit set selector 504, the sync pattern match checker 506, the mismatch metric generator 508, and the link synchronization checker 512 continue until link synchronization is successful.

Figure 6:
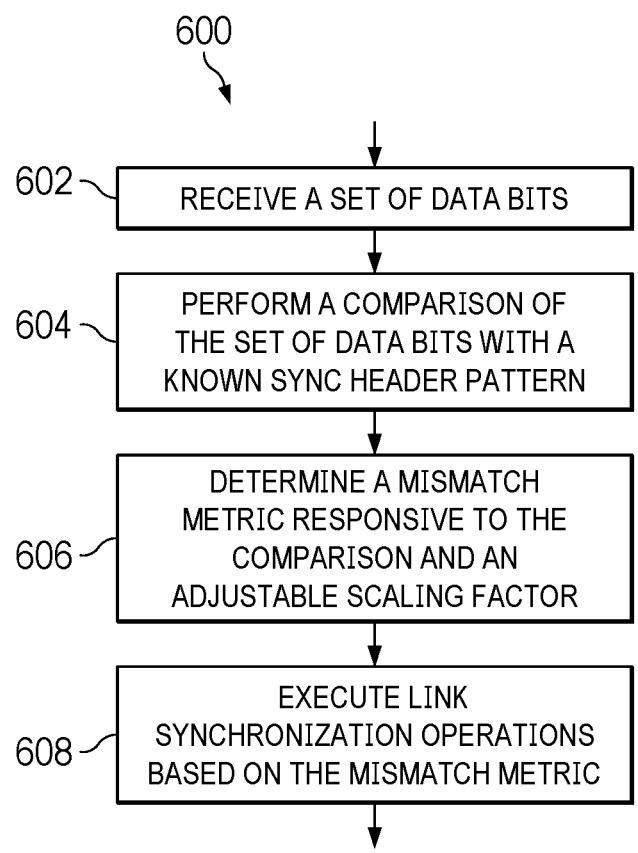
FIG. 6 is a flowchart showing an example link synchronization method.

FIG. 6 is a flowchart showing an example link synchronization method 600. The method 600 is performed, for example, by the link synchronization controller 120 of FIGS. 1 and 2, or the link synchronization controller 120A of FIG. 5. As shown, the link synchronization method 600 includes receiving a set of data bits at block 602. At block 604, a comparison of the set of data bits with a sync header pattern is performed. At block 606, a mismatch metric is determined responsive to the comparison and an adjustable scaling factor. The adjustable scaling factor enables comparison mismatches identified at block 604 to have a scaled value that increases or decreases the value of each mismatch. At block 608, link synchronization operations are performed based on the mismatch metric.

In some examples, executing the link synchronization operations at block 608 includes: comparing the mismatch metric to a mismatch threshold; incrementing a sync index offset responsive to the mismatch metric being greater than the mismatch threshold; and repeating the receive, perform, determine, comparing, and incrementing blocks for new sets of data bits based on the sync index offset until a related mismatch metric is less than the mismatch threshold. In some examples, the mismatch metric is a first mismatch metric, and executing the link synchronization operations at block 608 includes: repeating the receive, perform, and determine blocks for X sets of data bits offset by a predetermined offset, where X is an integer greater than 1; determining a cumulative mismatch metric based on the first mismatch metric and each mismatch metric determined for the X sets of data bits; comparing the cumulative mismatch metric to a threshold; and completing link synchronization responsive to the cumulative mismatch metric being less than the threshold.

In some examples, executing the link synchronization operations at block 608 includes: incrementing a sync index offset responsive to the cumulative mismatch metric being greater than the threshold; repeating the receive, perform, and determine blocks for Y new sets of data bits offset by a predetermined offset, where Y is an integer greater than 2; determining a new cumulative mismatch metric based on each mismatch metric determined for the Y sets of data bits; comparing the new cumulative mismatch metric to the threshold; and completing link synchronization responsive to the new cumulative mismatch metric being less than the threshold.

In some examples, the method 600 includes: performing link synchronization based on the adjustable scaling factor having a first value and mismatch metrics for a first number of sets of data bits; and performing link maintenance based on the adjustable scaling factor having a second value and mismatch metrics for a second number of sets of data bits, the second value greater than the first value, and the second number of sets greater than the first number of sets. In some examples, the method 600 includes decoding RS-FEC encoded data based on the completed link synchronization.

Figure 7:
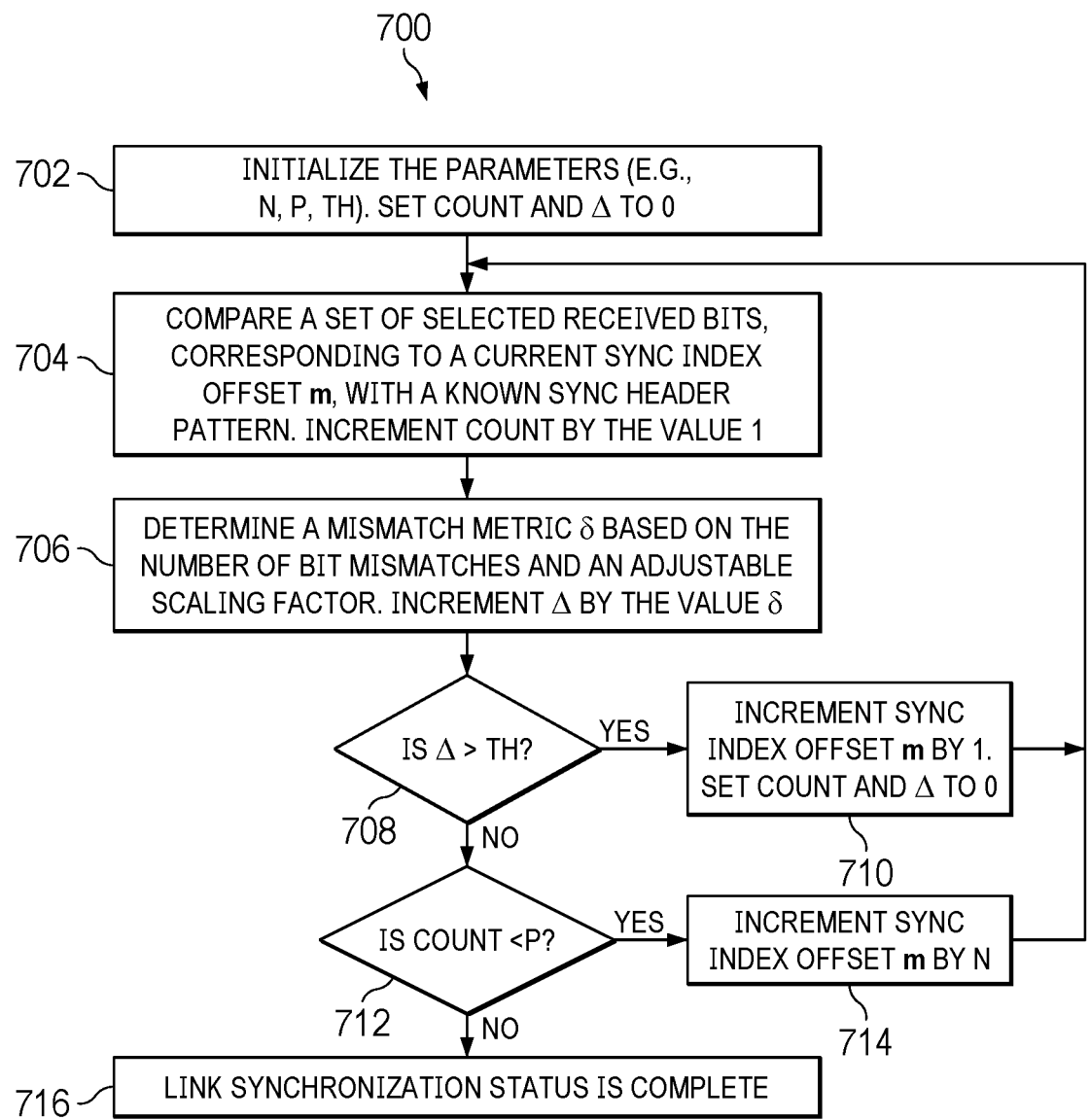
FIG. 7 is a flowchart showing another example link synchronization method.

FIG. 7 is a flowchart showing another example link synchronization method 700. The method 700 is performed, for example, by the link synchronization controller 120 of FIGS. 1 and 2, or the link synchronization controller 120A of FIG. 5. As shown, the link synchronization method 700 includes initializing a bit separation parameter N, a number of subsequent sets parameter P, and a threshold (TH) at block 702. Also, a count and a cumulative mismatch metric $\Delta$ are set to 0 at block 702. At block 704, a set of selected received bits corresponding to a current sync index m is compared with a sync header pattern. Also, the count is incremented by 1 at block 704. At block 706, the mismatch metric δ is determined based on the number of bit mismatches from the comparison of block 704 and an adjustable scaling factor. The value of Δ is also incremented by δ at block 706. If Δ is greater than a threshold (block 708), the sync index offset m is incremented by 1, and the count and Δ are set to zero at block 710. The method 700 then returns to block 704. If Δ is not greater than the threshold (block 708) and the count is less than P (block 712), the sync index offset m is incremented by N at block 714. In some examples, N is 5120. After block 714, the method 700 then returns to block 704. If Δ is not greater than the threshold (block 708) and the count is greater than P (block 712), the link synchronization status is complete at block 716.

With the method 700, the number of mismatches that are allowed is flexible using the adjustable scaling factor. Other link synchronization options include: parallel processing of multiple sync index offsets; using a cumulative mismatch metric for one or multiple iterations; and/or performing link maintenance operations. Once link synchronization is complete, the status of the link is continuously monitored to determine loss of synchronization. This is referred to as link maintenance. Loss of synchronization can happen for a variety of reasons. For example, the PHY layer PLL could go out of lock, or there may be cycle slips in the clock and data recovery (CDR) scheme resulting in missed or extra samples. During link maintenance, set of received data bits at index offsets that are integer multiples of N, with respect to the sync index offset determined during link synchronization, are compared against the sync header pattern. A scheme analogous to link synchronization is used, but with potentially different parameters (e.g., different values of TH, P, and/or the scaling factor). The flexible link synchronization operations described herein reduce the probability of missing a valid sync header location due to occurrence of bit errors. Reducing valid sync header misses reduces the overall synchronization time.

Figure 8:
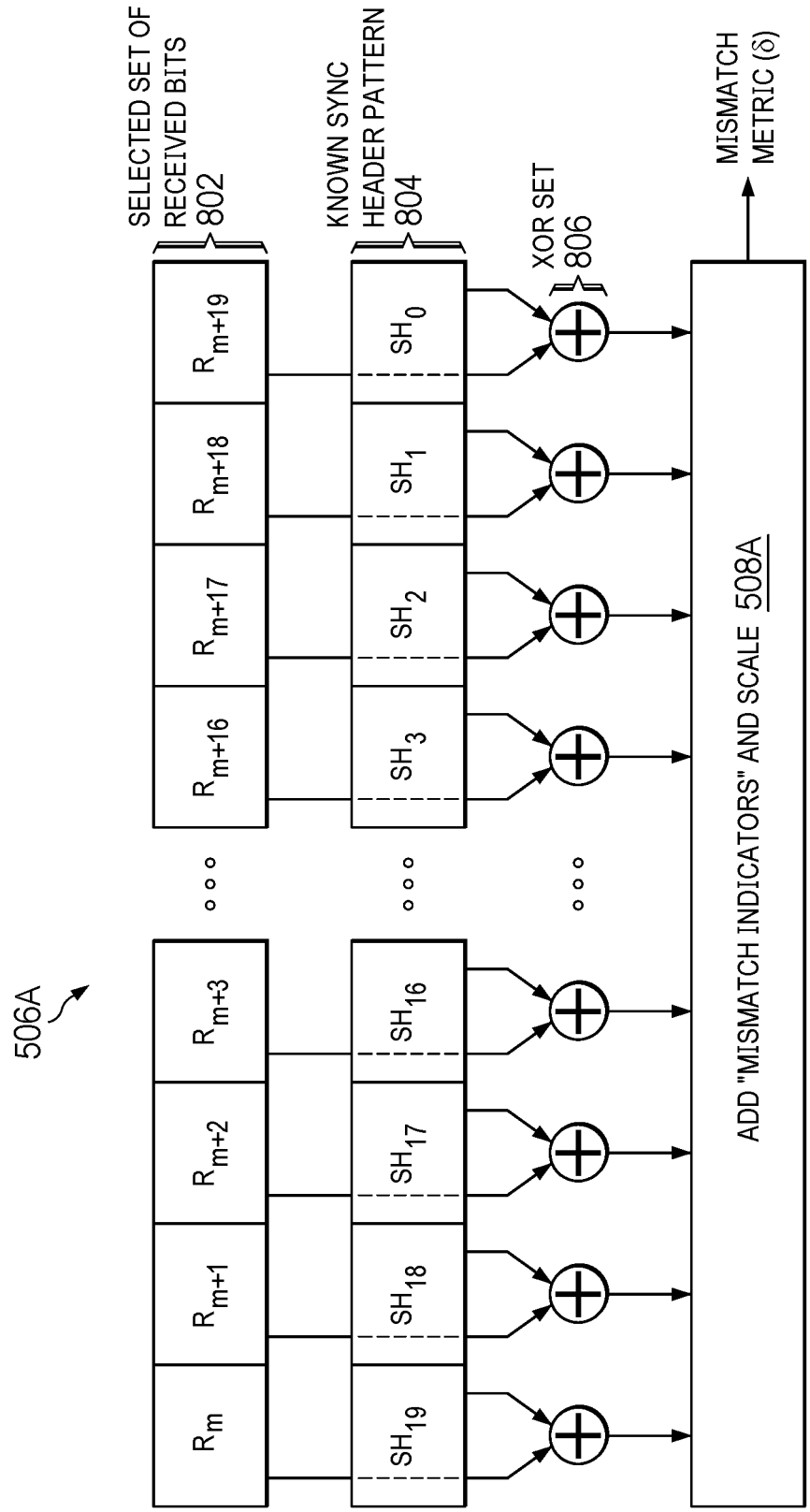
FIG. 8 is a diagram showing an example sync pattern match checker and mismatch metric generator.

FIG. 8 is a diagram showing an example sync pattern match checker 506A and mismatch metric generator 508A. The sync pattern match checker 506A is an example of the sync pattern match checker 506 in FIG. 5. In some examples, the sync pattern match checker 506A includes a set of XOR gates 806. Each XOR gate of the set of XOR gates 806 receives a respective received bit from a set of received bits 802 and a respective bit from a sync header pattern 804. In the example of FIG. 8, the set of received bits 802 includes bits $R_m$ to $R_{m+19}$. The sync header pattern 804 includes bits $SH_{19}$ to $SH_0$. If the respective bits received by an XOR gate have the same value, the XOR gate outputs a logic "0". Otherwise, if the respective bits received by an XOR gate do not have the same value, the XOR gate outputs a logic "1" as a mismatch indicator. The outputs from the XOR gates of the set of XOR gates 806 are coupled to a mismatch metric generator 508A. The mismatch metric generator 508A is an example of the mismatch metric generator 508 in FIG. 5. In operation, the mismatch metric generator 508A generates a mismatch metric δ by adding the mismatch indicators from the set of XOR gates 806 and applying a scaling factor. In some examples, the mismatch metric δ is computed as:

$$\delta = \text{ScaleFactor} * \Sigma_{i=0}^{19} \{R_{m+i} \oplus SH_{19-i}\} \qquad \text{Equation (1)}$$

In some examples, the cumulative mismatch metric for the current Count value is computed by adding the mismatch metric δ determined for the current Count value with the cumulative mismatch metric computed previously, i.e., from (Count−1). In other words, Δ(Count)=Δ(Count−1)+δ (Count).

Figure 9:
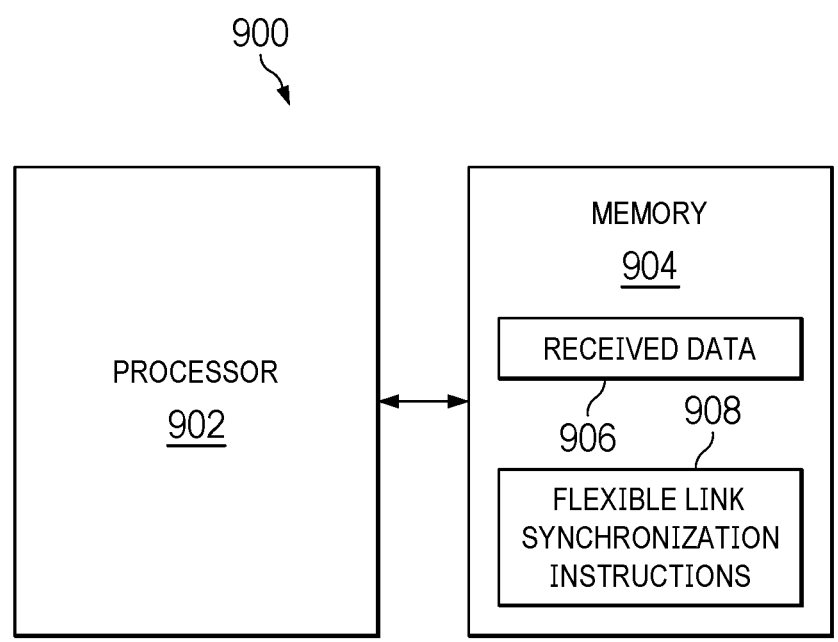
FIG. 9 is a block diagram showing an example processing system to perform link synchronization operations.

FIG. 9 is a block diagram showing an example processing system 900 to perform link synchronization operations. In some examples, the processing system 900 is included with a receiver, such as the JESD204 receiver 220 in FIG. 2, and performs link synchronization operations. In other examples, the processing system 900 is coupled to a receiver, such as the JESD204 receiver 220 in FIG. 2, and performs link synchronization operations. As shown, the processing system 900 includes a processor 902 and a memory 904. The memory 904 stores received data 906 and flexible link synchronization instructions 908. In some examples, the processor 902 executes the flexible link synchronization instructions 908 to perform link synchronization operations. Example link synchronization operations performed by the processor 902, when executing the flexible link synchronization instructions 908, include the operations described for the receive bit set selector 504, the sync pattern match checker 506, the mismatch metric generator 508, the mismatch metric accumulator 510, the link synchronization checker 512, and the sync offset index updater 514. Other example link synchronization operations performed by the processor 902, when executing the flexible link synchronization instructions 908, include the operations of method 600 of FIG. 6 and/or the operations of method 700 of FIG. 7.

In some examples, a receiver, such as the JESD204 receiver 220 of FIG. 2, includes a PHY layer (e.g., the PHY layer 222 in FIG. 2) and a processor (e.g., the processor 902 in FIG. 9). The processor is configured to: receive a set of data bits; perform a comparison of the set of data bits to a sync header pattern; determine a mismatch metric responsive to the comparison and an adjustable scaling factor; and execute link synchronization operations based on the mismatch metric. In some examples, the processor is configured to execute the link synchronization operations by: comparing the mismatch metric to a mismatch threshold; incrementing a sync index offset responsive to the mismatch metric being greater than the mismatch threshold; and repeating the receive, perform, determine, comparing, and incrementing steps for new sets of data bits based on the sync index offset until a related mismatch metric is less than the mismatch threshold. In some examples, the mismatch metric is a first mismatch metric, and the processor is configured to execute the link synchronization operations by: repeating the receive, perform, and determine blocks for X sets of data bits offset by a predetermined offset, where X is an integer greater than 1; determining a cumulative mismatch metric based on the first mismatch metric and each mismatch metric determined for the X sets of data bits; comparing the cumulative mismatch metric to a threshold; and completing link synchronization responsive to the cumulative mismatch metric being less than the threshold.

In some examples, the processor is configured to execute the link synchronization operations by: incrementing a sync index offset responsive to the cumulative mismatch metric being greater than the threshold; repeating the receive, perform, and determine steps for Y new sets of data bits offset by a predetermined offset, where Y is an integer greater than 2; determining a new cumulative mismatch metric based on each mismatch metric determined for the Y sets of data bits; comparing the new cumulative mismatch metric to the threshold; and completing link synchronization responsive to the new cumulative mismatch metric being less than the threshold. In some examples, the processor is configured to: perform link synchronization based on the adjustable scaling factor having a first value and mismatch metrics for a first number of sets of data bits; and perform link maintenance based on the adjustable scaling factor having a second value and mismatch metrics for a second number of sets of data bits, the second value greater than the first value, and the second number of sets greater than the first number of sets. In some examples, a receiver includes a link layer (e.g., the RX link layer 118 in FIG. 1) configured to decode RS-FEC encoded data based on the completed link synchronization.

In some examples, a system, such as the system 100, includes: a first IC having a transmitter; and a second IC having a receiver coupled to the transmitter via a serial communication interface. In some examples, the first IC includes an integrated transceiver and the second IC includes a baseband processor.

In some examples, the receiver is configured to: receive a set of data bits; perform a comparison of the set of data bits to a sync header pattern; determine a mismatch metric responsive to the comparison and an adjustable scaling factor; and execute link synchronization operations based on the mismatch metric. In some examples, the receiver is configured to execute the link synchronization operations by: comparing the mismatch metric to a mismatch threshold; incrementing a sync index offset responsive to the mismatch metric being greater than the mismatch threshold; and repeating the receive, perform, determine, comparing, and incrementing steps for new sets of data bits based on the sync index offset until a related mismatch metric is less than the mismatch threshold. In some examples, the mismatch metric is a first mismatch metric, and the receiver is configured to execute the link synchronization operations by: repeating the receive, perform, and determine steps for X sets of data bits offset by a predetermined offset, where X is an integer greater than 1; determining a cumulative mismatch metric based on the first mismatch metric and each mismatch metric determined for the X sets of data bits; comparing the cumulative mismatch metric to a threshold; and completing link synchronization responsive to the cumulative mismatch metric being less than the threshold.

In some examples, the receiver is configured to execute the link synchronization operations by: incrementing a sync index offset responsive to the cumulative mismatch metric being greater than the threshold; repeating the receive, perform, and determine steps for Y new sets of data bits offset by a predetermined offset, where Y is an integer greater than 2; determining a new cumulative mismatch metric based on each mismatch metric determined for the Y sets of data bits; comparing the new cumulative mismatch metric to the threshold; and completing link synchronization responsive to the new cumulative mismatch metric being less than the threshold.

In some examples, the receiver is configured to: perform link synchronization based on the adjustable scaling factor having a first value and mismatch metrics for a first number of sets of data bits; and perform link maintenance based on the adjustable scaling factor having a second value and mismatch metrics for a second number of sets of data bits, the second value greater than the first value, and the second number of sets greater than the first number of sets. In some examples, the receiver includes a link layer configured to decode RS-FEC encoded data based on the completed link synchronization.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A receiver comprising:
a PHY layer; and
a processor coupled to the PHY layer and configured to:
receive a set of data bits from the PHY layer;
compare the set of data bits to a sync header pattern, wherein the comparing includes comparing each bit of the set of data bits to a respective bit of the sync header pattern to detect a corresponding bit mismatch;
determine a mismatch metric based on the corresponding bit mismatches and an adjustable scaling factor; and
execute link synchronization operations based on the mismatch metric.

2. The receiver of claim 1, wherein the processor is configured to execute the link synchronization operations by:
comparing the mismatch metric to a mismatch threshold;
incrementing a sync index offset responsive to the mismatch metric being greater than the mismatch threshold; and
repeating the receive, determine, comparing, and incrementing for new sets of data bits based on the sync index offset until a related mismatch metric is less than the mismatch threshold.

3. The receiver of claim 1, wherein the mismatch metric is a first mismatch metric, and the processor is configured to execute the link synchronization operations by:
repeating the receive, and determine for X sets of data bits offset by an offset, where X is an integer greater than 1;
determining a cumulative mismatch metric based on the first mismatch metric and each mismatch metric determined for the X sets of data bits;
comparing the cumulative mismatch metric to a threshold; and
completing link synchronization responsive to the cumulative mismatch metric being less than the threshold.

4. The receiver of claim 3, wherein the processor is configured to execute the link synchronization operations by:
incrementing a sync index offset responsive to the cumulative mismatch metric being greater than the threshold;
repeating the receive, and determine for Y new sets of data bits offset by an offset, where Y is an integer greater than 2;
determining a new cumulative mismatch metric based on each mismatch metric determined for the Y sets of data bits;
comparing the new cumulative mismatch metric to the threshold; and
completing link synchronization responsive to the new cumulative mismatch metric being less than the threshold.

5. The receiver of claim 3, further comprising a link layer configured to decode Reed-Solomon Forward Error Correction (RS-FEC) encoded data based on the completed link synchronization.

6. The receiver of claim 1, wherein the processor is configured to:
perform link synchronization based on the adjustable scaling factor having a first value and mismatch metrics for a first number of sets of data bits; and
perform link maintenance based on the adjustable scaling factor having a second value and mismatch metrics for a second number of sets of data bits, the second value greater than the first value, and the second number of sets greater than the first number of sets.

7. A method comprising:
receiving a set of data bits;
compare the set of data bits to a sync header pattern, wherein the comparing includes comparing each bit of the set of data bits to a respective bit of the sync header pattern to detect a corresponding bit mismatch;
determine a mismatch metric based on the corresponding bit mismatches and an adjustable scaling factor; and
execute link synchronization operations based on the mismatch metric.

8. The method of claim 7, wherein executing the link synchronization operations includes:
comparing the mismatch metric to a mismatch threshold;
incrementing a sync index offset responsive to the mismatch metric being greater than the mismatch threshold; and
repeating the receive, determine, comparing, and incrementing for new sets of data bits based on the sync index offset until a related mismatch metric is less than the mismatch threshold.

9. The method of claim 7, wherein the mismatch metric is a first mismatch metric, and executing the link synchronization operations includes:
repeating the receive, and determine for X sets of data bits offset by an offset, where X is an integer greater than 1;
determining a cumulative mismatch metric based on the first mismatch metric and each mismatch metric determined for the X sets of data bits;
comparing the cumulative mismatch metric to a threshold; and
completing link synchronization responsive to the cumulative mismatch metric being less than the threshold.

10. The method of claim 9, wherein executing the link synchronization operations includes:
incrementing a sync index offset responsive to the cumulative mismatch metric being greater than the threshold;
repeating the receive, and determine for Y new sets of data bits offset by an offset, where Y is an integer greater than 2;
determining a new cumulative mismatch metric based on each mismatch metric determined for the Y sets of data bits;
comparing the new cumulative mismatch metric to the threshold; and
completing link synchronization responsive to the new cumulative mismatch metric being less than the threshold.

11. The method of claim 9, further comprising decoding Reed-Solomon Forward Error Correction (RS-FEC) encoded data based on the completed link synchronization.

12. The method of claim 7, further comprising:
performing link synchronization based on the adjustable scaling factor having a first value and mismatch metrics for a first number of sets of data bits; and
performing link maintenance based on the adjustable scaling factor having a second value and mismatch metrics for a second number of sets of data bits, the second value greater than the first value, and the second number of sets greater than the first number of sets.

13. A system comprising:
a first integrated circuit (IC) having a transmitter;
a serial communication interface; and
a second IC having a receiver in communication with the transmitter via the serial communication interface, the receiver configured to:
 receive a set of data bits;
 compare the set of data bits to a sync header pattern, wherein the comparing includes comparing each bit of the set of data bits to a respective bit of the sync header pattern to detect a corresponding bit mismatch;
 determine a mismatch metric based on the corresponding bit mismatches and an adjustable scaling factor; and
 execute link synchronization operations based on the mismatch metric.

14. The system of claim 13, wherein the first IC includes a baseband processor and the second IC includes a data converter.

15. The system of claim 13, wherein the first IC includes a data converter and the second IC includes a baseband processor.

16. The system of claim 13, wherein the receiver is configured to execute the link synchronization operations by:
 comparing the mismatch metric to a mismatch threshold;
 incrementing a sync index offset responsive to the mismatch metric being greater than the mismatch threshold; and
 repeating the receive, determine, comparing, and incrementing for new sets of data bits based on the sync index offset until a related mismatch metric is less than the mismatch threshold.

17. The system of claim 16, wherein the receiver includes a link layer configured to decode Reed-Solomon Forward Error Correction (RS-FEC) encoded data based on a completed link synchronization.

18. The system of claim 13, wherein the mismatch metric is a first mismatch metric, and the receiver is configured to execute the link synchronization operations by:
 repeating the receive, and determine for X sets of data bits offset by an offset, where X is an integer greater than 1;
 determining a cumulative mismatch metric based on the first mismatch metric and each mismatch metric determined for the X sets of data bits;
 comparing the cumulative mismatch metric to a threshold; and
 completing link synchronization responsive to the cumulative mismatch metric being less than the threshold.

19. The system of claim 18, wherein the receiver is configured to execute the link synchronization operations by:
 incrementing a sync index offset responsive to the cumulative mismatch metric being greater than the threshold;
 repeating the receive, and determine for Y new sets of data bits offset by an offset, where Y is an integer greater than 2;
 determining a new cumulative mismatch metric based on each mismatch metric determined for the Y sets of data bits;
 comparing the new cumulative mismatch metric to the threshold; and
 completing link synchronization responsive to the new cumulative mismatch metric being less than the threshold.

20. The system of claim 13, wherein the receiver is configured to:
 perform link synchronization based on the adjustable scaling factor having a first value and mismatch metrics for a first number of sets of data bits; and
 perform link maintenance based on the adjustable scaling factor having a second value and mismatch metrics for a second number of sets of data bits, the second value greater than the first value, and the second number of sets greater than the first number of sets.

* * * * *